United States Patent
Ramaswamy

(10) Patent No.: US 6,643,512 B1
(45) Date of Patent: Nov. 4, 2003

(54) METHOD AND APPARATUS FOR SPANNING OPERATION OF A CELLULAR TELEPHONE

(75) Inventor: Satyanarayanan Ramaswamy, Wheeling, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/395,791

(22) Filed: Sep. 14, 1999

(51) Int. Cl.⁷ .................................................. H04Q 7/20
(52) U.S. Cl. ........................ 455/435; 455/437; 455/552
(58) Field of Search ................................ 455/435, 450, 455/443, 434, 502, 422, 552, 462, 515, 555, 403, 411, 461; 370/331, 330, 332, 333, 336, 337, 316, 466, 522; 709/236

(56) References Cited

U.S. PATENT DOCUMENTS

| | | | |
|---|---|---|---|
| 4,131,849 A | | 12/1978 | Freeburg et al. ............... 325/54 |
| 4,903,261 A | | 2/1990 | Baran et al. ................. 370/94.2 |
| 5,448,619 A | * | 9/1995 | Evans et al. .................... 379/58 |
| 5,903,839 A | * | 5/1999 | Mattila ......................... 455/434 |
| 5,924,038 A | * | 7/1999 | Uistola ......................... 455/450 |
| 5,987,317 A | * | 11/1999 | Venturini ...................... 455/412 |
| 6,044,070 A | * | 3/2000 | Valentine et al. ............ 370/316 |
| 6,070,081 A | * | 5/2000 | Takahashi et al. ........... 455/463 |
| 6,112,088 A | * | 8/2000 | Haartsen ....................... 455/437 |
| 6,169,895 B1 | * | 1/2001 | Buhrmann et al. .......... 455/423 |
| 6,229,996 B1 | * | 5/2001 | Uistola ..................... 455/168.1 |
| 6,233,450 B1 | * | 5/2001 | Seppanen .................... 455/426 |

\* cited by examiner

*Primary Examiner*—Edward F. Urban
*Assistant Examiner*—C. Chow
(74) *Attorney, Agent, or Firm*—Paul J. Bartusiak; Matthew C. Loppnow

(57) ABSTRACT

The apparatus and method of the present invention provides a system for spanning operation of a mobile station (110) between a public cellular system (100) for packet data service and a private autonomous cellular system (102) for circuit services when both services are available. In the disclosed system, the mobile station (110) remains on the public system (100) until a circuit call needs to be set up. If the mobile station (110) receives a call on the autonomous system (102), it is notified by the public system (100) via a tunneling message. If the mobile station (110) wishes to originate a call, it switches to the control channels of the autonomous system (102). If the signal strength of the autonomous system (102) falls below a predefined threshold, the mobile station (110) exits the disclosed dual mode, thereby receiving both packet and circuit services from the public system 100.

20 Claims, 4 Drawing Sheets

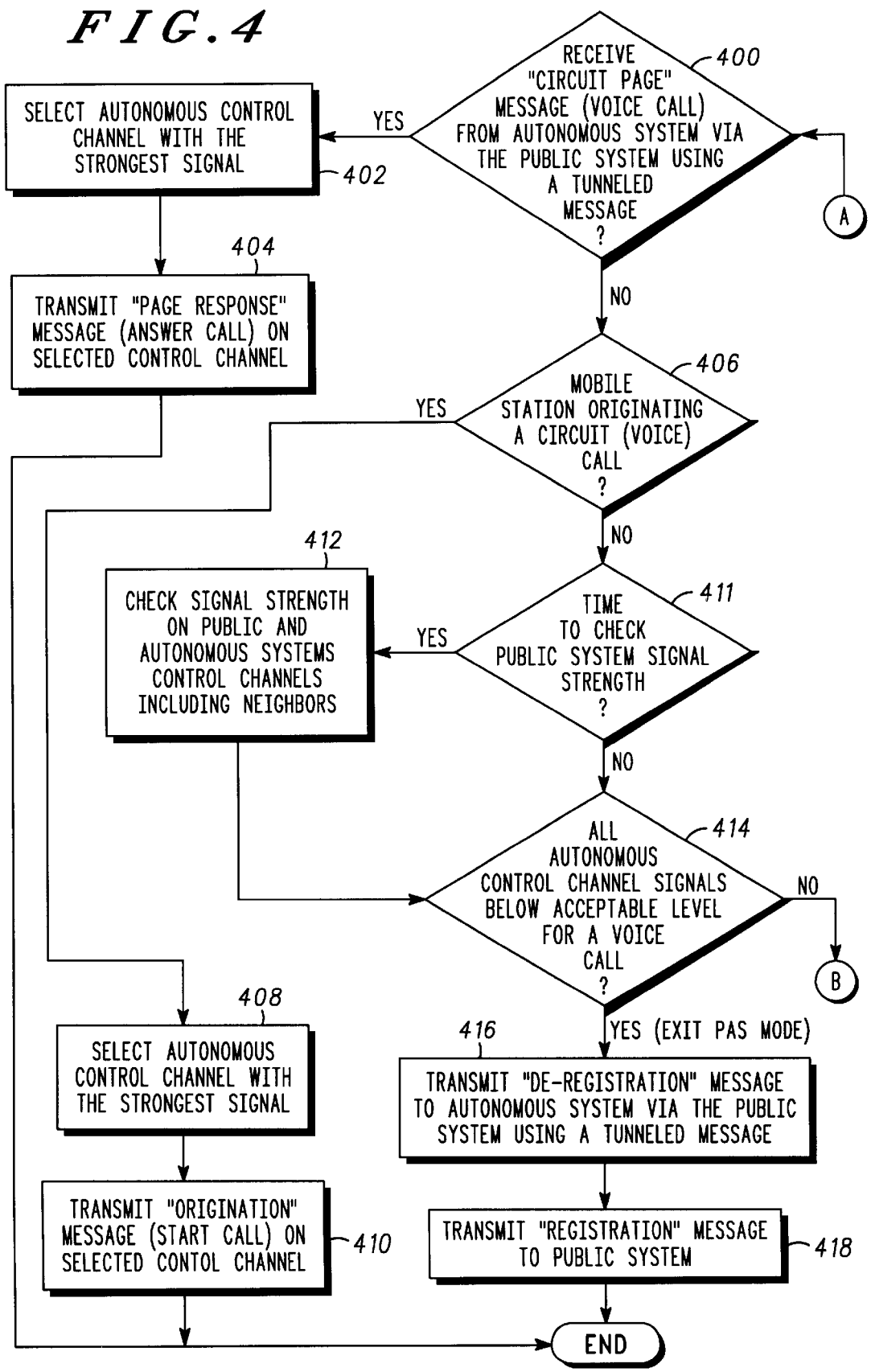

METHOD AND APPARATUS FOR SPANNING OPERATION OF A CELLULAR TELEPHONE

FIELD OF THE INVENTION

The present invention relates in general to a method and apparatus for spanning operation of a cellular telephone between two cellular systems and in particular to spanning operation of a cellular telephone between a public cellular system for packet data services and an autonomous cellular system for circuit services.

BACKGROUND OF THE INVENTION

Wireless communications systems come in many "shapes and sizes." Some systems offer exclusively voice services. Other systems offer exclusively data service. Still other systems offer a combination of voice and data services. Typically each system comes with a different set of frequencies in which it operates and a different set of protocols it uses for providing communications on these frequencies. Some of these systems cover large contiguous geographical regions, while others cover small specialized pockets. Still further, the cost of equipment and airtime varies from system to system. In other words, different systems are designed around different performance requirements.

Often the geographical coverage of two or more of these cellular systems will overlap. Accordingly, some cellular telephones are designed to take advantage of more than one system. For example, a cellular phone may communicate with a cellular system under most circumstances, but automatically switch to communicate with a private autonomous transceiver connected to the user's residential telephone line when he is in his home. This arrangement may decrease operational costs. However, if the user also receives data services with voice services from the cellular system, the data services may be lost when the phone switches to the residential system, because the typical landline phone service does not deliver the same data that a cellular system delivers.

One solution to this problem is a cellular telephone with more than one receiver. Such a phone could continue to monitor the cellular system for data while using the local residential system for voice calls. However, an additional receiver would increase the cost and complexity of the cellular telephone. Another solution is to periodically alternate the tuning of a single receiver between a carrier frequency associated with the residential system and a carrier frequency associated with the cellular system (i.e., frequency hopping). However, this solution is also unsatisfactory, because the data frequencies of the two systems may not allow such carrier frequency hopping without occasionally missing a call and/or some data.

SUMMARY OF THE INVENTION

The present invention is directed to a system for spanning operation of a cellular telephone between a public cellular system and an autonomous cellular system. Typically, the geographic region of the autonomous cellular system is within the geographic region covered by the public cellular system. When the cellular telephone is within a region of overlap between the autonomous system and the public system, it may use the public system primarily for data services and the autonomous cellular system for voice services. When the cellular telephone leaves the region of overlap and enters a region covered only by the public system, it may switch to using the public system for both data and voice services.

In one aspect, the invention is directed to a method for spanning operation of a cellular telephone between a public cellular system for packet services and an autonomous cellular system for circuit services. The public cellular system covers a first geographic region and the autonomous cellular system covers a second geographic region, wherein the first geographic region intersects the second geographic region. Using the method, the cellular telephone receives a pointer to a public control channel associated with the public cellular system via an autonomous control channel associated with the autonomous cellular system. The cellular telephone then makes a request for packet service by transmitting an attach message to the public cellular system via the public control channel. If the cellular telephone receives a success message from the public cellular system via the public control channel (e.g., a positive acknowledgment to the attach message), then the cellular telephone makes a request to initiate circuit services by transmitting a first registration message to the autonomous cellular system via the public control channel using a first tunneling protocol. If the cellular telephone receives a circuit page message from the autonomous cellular system via the public control channel using a second tunneling protocol (e.g., a request to accept a pending cellular telephone voice call), then the cellular telephone acknowledges the circuit page message by transmitting a page response message to the autonomous cellular system via the autonomous control channel.

In one embodiment, the cellular telephone makes a request to place a cellular telephone voice call by transmitting an origination message to the autonomous cellular system via the autonomous control channel. In some embodiments, the cellular telephone makes a request to terminate circuit services with the autonomous cellular system by transmitting a de-registration message to the autonomous cellular system via the public control channel using the first tunneling protocol, and the cellular telephone also makes a request to initiate circuit services with the public cellular system by transmitting a second registration message to the public cellular system via the public control channel.

In a preferred embodiment the first geographic region is larger than the second geographic region, and the first geographic region completely encompasses the second geographic region. Further, in a preferred embodiment, the public cellular system is a Global Station for Mobile Communications (GSM) station operating according to the GSM 03.60 GPRS-136 general packet radio service system standard, the public control channel comprises a TIA/EIA-136-123 DCCH Layer 3 digital control channel, and the first tunneling protocol and the second tunneling protocol comprises a TIA/EIA-136-336 TOM protocol.

In another aspect a cellular telephone capable of spanning operation between a public cellular system for packet services and an autonomous cellular system for circuit services is provided. The public cellular system covers a first geographic region and the autonomous cellular system covers a second geographic region. The first geographic region intersecting the second geographic region. The cellular telephone includes a receiver for receiving a pointer message via an autonomous control channel associated with the autonomous cellular system. The pointer message includes a pointer to a public control channel associated with the public cellular system. The receiver also receives a success message from the public cellular system via the public control channel. The success message is indicative of a positive acknowledgment to the attach message. Still further, the receiver receives a circuit page message from the autonomous cellular system via the public control channel using a second tunneling protocol. The circuit page message is indicative of a request to accept a pending cellular telephone voice call. The cellular telephone also includes a transmitter for transmitting an attach message to the public cellular system via the public control channel. The attach message is indicative of a request for packet services. The transmitter also transmits a first registration message to the autonomous cellular system via the public control channel using a first tunneling protocol. The first registration message is indicative of a request to initiate circuit services. Still further, the transmitter transmits a page response message to the autonomous cellular system via the autonomous control channel. The page response message is indicative of a positive acknowledgment to the circuit page message. In addition, the cellular telephone includes a controller. The controller is operatively coupled to the transmitter and the receiver. The controller is adapted to decode the pointer message, decode the success message, decode the circuit page message, generate the attach message, generate the first registration message, and generate the page response message.

BRIEF DESCRIPTION OF THE DRAWINGS

These and other features and advantages of the present invention will be apparent to those of ordinary skill in the art in view of the detailed description of the preferred embodiment which is made with reference to the drawings, a brief description of which is provided below.

FIGS. 3–4 are a flowchart of a program that can be implemented by the mobile station of FIG. 2 to span operation between the public cellular system of FIG. 1 for packet services and the autonomous cellular system of FIG. 1 for circuit services in accordance with a preferred embodiment of the present invention.

DETAILED DESCRIPTION OF THE PREFERRED EMBODIMENTS

In general, the system of the present invention supports a mode of operation where a mobile station, such as a cellular telephone, can use a private autonomous system for circuit service (e.g., voice calls) and a public system for packet service (e.g., data messages). This mode of operation will be referred to herein as public-packet and autonomous-circuit span (PAS) mode. Typically, small private autonomous systems (e.g., a cell serving a single home or office building) provide voice services at lower billing rates than large public systems. However, these private systems may not include packet data services such paging, news, stock prices, etc. Accordingly, a system employing PAS mode enjoys the benefits of cheaper voice services without giving up packet services.

When a mobile station is in PAS mode, it obtains packet services from the public system and circuit services from the private autonomous system simultaneously, but the mobile station does not monitor the control channels of both systems simultaneously. Instead, the mobile station uses the public system to send and receive control signals to and from both the public system and the private autonomous system. Preferably, the public control channel comprises a GPRS-136 packet control channel. In order to exchange control signals with the private autonomous system via the public system, a tunneling message is used. A tunneling message is a message directed to a destination system (e.g., the private system) wrapped in a protocol envelope for an intermediate system (e.g., the public system). Once the tunneling message is received by the intermediate system, the protocol envelope is removed and the message is forwarded to the destination system.

The mobile station stays on the public system's packet channels until a circuit call needs to be set up. If the mobile station is receiving a call via the private system, it is notified by the public system via a tunneling message from the private system. If the mobile station is notified of an incoming call, or the mobile station wishes to originate an outgoing call, it switches to the control channels of the private system for signals associated with that call. Periodically, the mobile station monitors the signal strength of the private system. If the signal strength of the private system falls below a predefined threshold (e.g., if the mobile station moves out of the area covered by the private system), the mobile station exits PAS mode, thereby receiving both packet and circuit services from the public system.

Figure 1:
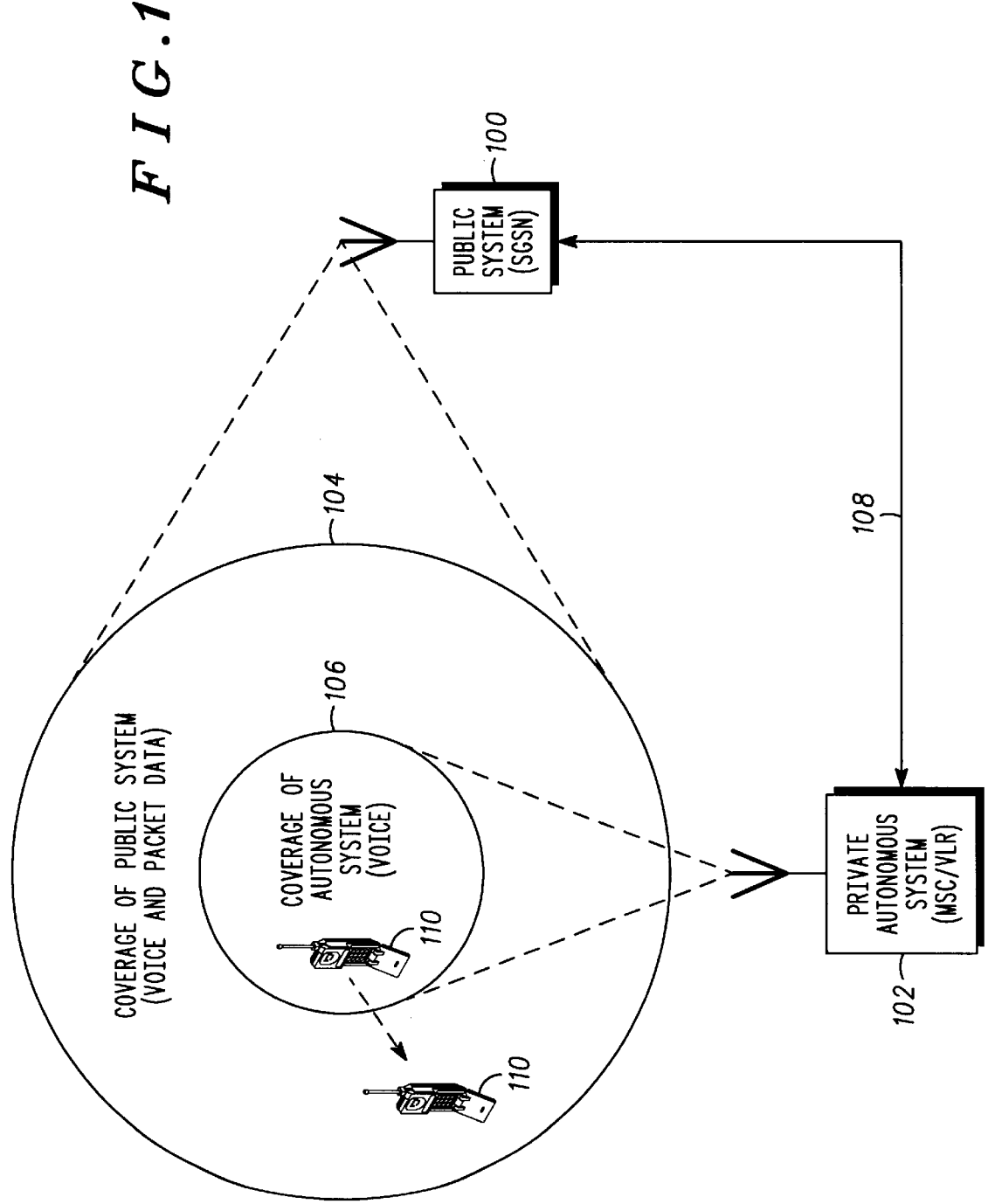
FIG. 1 is a diagram of a public cellular system and an autonomous cellular system that implements a preferred embodiment of the method and apparatus of the present invention.

A diagram of a public cellular system 100 and a private autonomous cellular system 102 that implements a preferred embodiment of the method and apparatus of the present invention is illustrated in FIG. 1. In this example, the geographic region 104 covered by the public system 100 is larger than and completely encompasses the geographic region 106 covered by the autonomous system 102. The public system 100 may be a GSM 03.60 GPRS-136 general packet radio service system using a serving GPRS support node (SGSN), and the autonomous system 102 is a mobile switching center/visitor location register (MSC/VLR). Details regarding mobility management with an SGSN and a MSC/VLR can be found in the TIA/EIA-136-336 specification, which is incorporated here by reference.

In a preferred embodiment, the public system 100 communicates with one or more private systems 102 via a land based network 108. Of course, a person having ordinary skill in the art will readily appreciate that any type or types of communication may be used between the public system 100 and the private system 102. When a mobile station 110 is within the geographic region 106 covered by the autonomous system 102, and that area is also covered, at least in part, by the public system 100 (i.e., the two areas intersect), the mobile station 110 preferably uses the private system 102 for circuit services (e.g., voice calls) and the public system for packet services (e.g., data messages). When the mobile station 110 moves out of the geographic region 106 covered by the autonomous system 102, voice services are switched to the public system 100. In other words, the mobile station 110 enters/exits PAS mode when ever it enters/exits the geographic region 106 covered by both systems 100, 102, thereby reducing airtime charges without giving up any services.

When a mobile station 110 is within the geographic region 106 covered by both systems 100, 102, direct communication to and from the mobile station 110 is performed primarily with the public system 100. A transmitter 214 and a receiver 212 (see FIG. 2) in the mobile station 110 are typically tuned to frequencies associated with the public system 100. In order to transmit a control signal from the mobile station 110 to the autonomous system 102, the mobile station 110 transmits the control signal to the public system 100 using a tunneling message protocol. The public system 100 then relays the control signal to the autonomous system 102 via the network 108. Similarly, in order to transmit a control signal from the autonomous system 102 to the mobile station 110 (e.g., for receiving a voice call at the mobile station 110), the autonomous system 102 transmits the control signal to the public system 100 via the network 108 using a tunneling message protocol. The public system 100 then relays the control signal to the mobile station 110 using frequencies associated with the public system 100. Once a voice call is setup (i.e., the necessary control signals have been exchanged), the mobile station 110 switches to the autonomous system 102 (i.e., tunes its transmitter and receiver to frequencies associated with the autonomous system 102) during the call.

In a preferred embodiment, the tunneling protocol is the TIA/EIA-136-336 Tunneling of Messages (TOM) protocol discussed in detail in the TIA/EIA-136-336 specification. TOM is a generic protocol layer used for the exchange of TOM protocol envelopes between the public system 100 and the autonomous system 102. The TOM protocol envelope is composed of a TOM protocol header and a message capsule. Preferably, the TOM protocol header identifies TIA/EIA-136 as the technology using TOM and also contains TIA/EIA-136 specific information. The message capsule is the actual payload of information in the TOM protocol envelope and is exchanged between the public system 100 and the autonomous system 102. When sending messages, the TOM protocol envelope provides the message capsule and the information to be used by the public system 100 to route the message capsule to the appropriate autonomous system 102.

Figure 2:
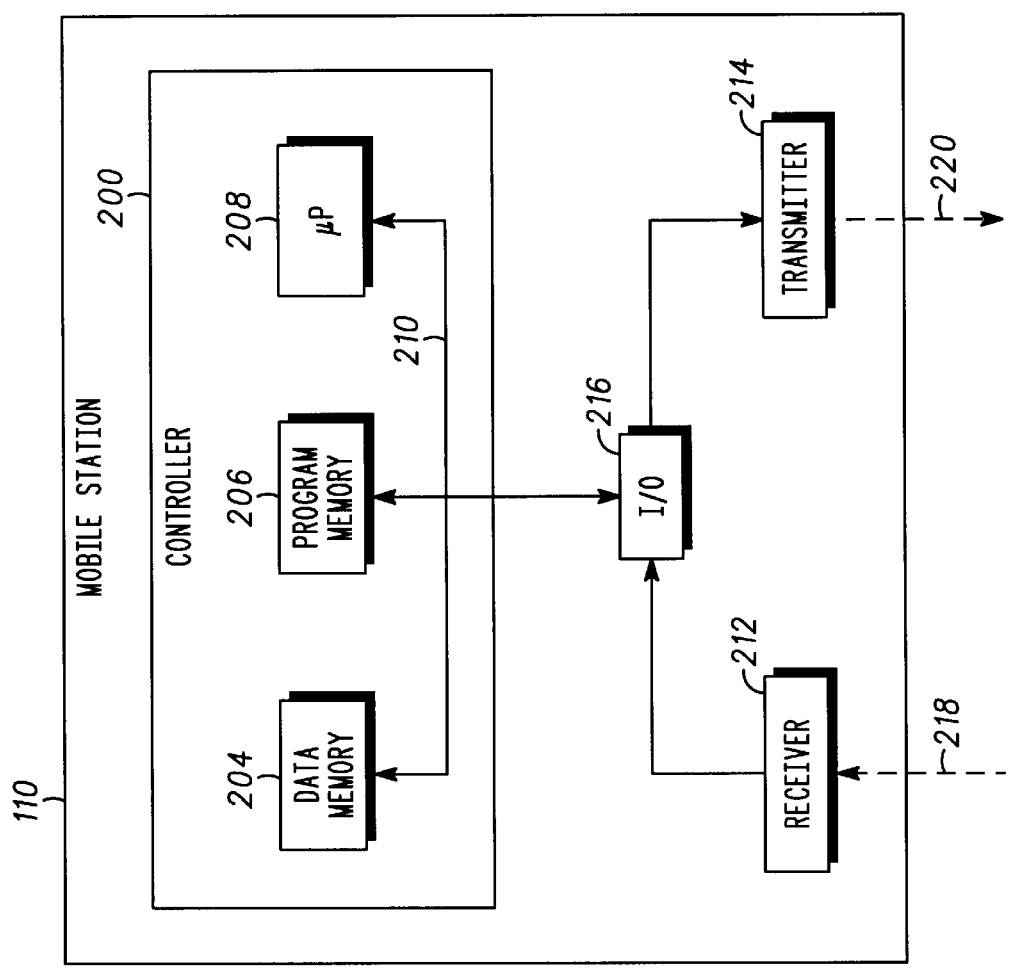
FIG. 2 is a block diagram illustrating more details of the mobile station of FIG. 1 embodying the present invention.

A more detailed block diagram of the mobile station 110, capable of utilizing the present invention, is illustrated in FIG. 2. In a preferred embodiment, the mobile station 110 may be a GPRS-136 compatible cellular telephone. However, the mobile station 110 may be any type of wireless communication device, such as a satellite telephone or pager, programmed to implement the method and/or apparatus of the present invention. A controller 200 in the mobile station 110 preferably includes a data memory 204, such as a random-access memory, a program memory 206, which may be in the form of a read-only memory (ROM), and a microprocessor 208, all of which may be interconnected by an address/data bus 210. In one embodiment, the program memory 206 electronically stores a computer program that implements all or part of the method described below. The program is preferably executed by the microprocessor 208. The program memory 206 may be loaded from a fixed memory device such as a PCMCIA card, or the program memory 206 may be preloaded with firmware as is well known to persons of ordinary skill in the art. Some of the steps described in the method below may be performed manually or without the use of the mobile station 10.

Preferably, a receiver 212 and a transmitter 214 are electronically coupled to the controller 200 via a conventional input/output (I/O) circuit 216. Preferably, the controller 200 receives time-division multiple access (TDMA) signals 218 via the receiver 212. In response to certain received signals 218, the controller 200 generates TDMA signals and causes the transmitter 214 to transmit the TDMA signals 220. Of course, a person of ordinary skill in the art will readily appreciate that other types of signals may be transmitted and/or received in the scope and spirit of the present invention. For example, frequency-division multiple access (FDMA) signals and/or code-division multiple access (CDMA) signals may be used.

Figure 3:
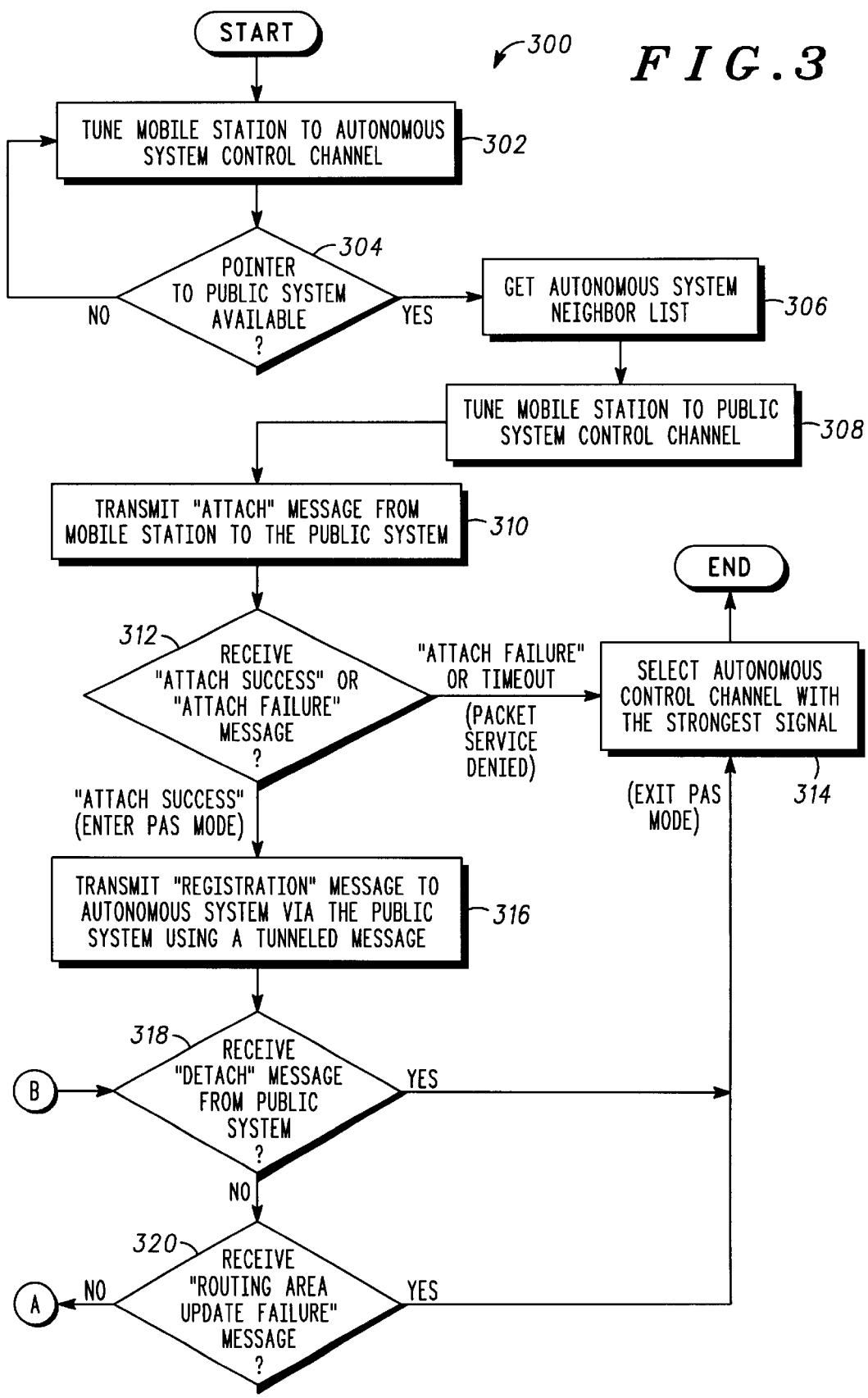

A flowchart of a program 300 that can be implemented by the mobile station 110 to span operation between a public cellular system for packet services and an autonomous cellular system for circuit services, in accordance with a preferred embodiment of the present invention, is illustrated in FIG. 3 and FIG. 4. Preferably, the steps are performed by the controller 200.

In general, the mobile station 110 remains on the public system 100 until a circuit call needs to be set up. If the mobile station 110 receives a call on the autonomous system 102, it is notified by the public system 100 via a tunneling message. If the mobile station 110 wishes to originate a call, it switches to the control channels of the autonomous system 102. If the signal strength of the autonomous system 102 falls below a predefined threshold (e.g., if the mobile station 110 moves out of the area covered by the private system), the mobile station 110 exits PAS mode, thereby receiving both packet and circuit services from the public system 100.

The program 300 begins by causing the mobile station 110 to tune its receiver 212 to a control channel frequency associated with an autonomous system 102 (step 302) and looking for a pointer to a public system 100 (step 304). When the mobile station 110 receives a pointer to a public system 100, it also receives a neighbor list (step 306). The neighbor list identifies other control channels in this autonomous system 102. Preferably, the control channel with the strongest signal is used by the mobile station 110. Subsequently, the mobile station 110 tunes its transmitter 214 and receiver 212 to a control channel frequency associated with the public system 100 (step 308), and transmits an "attach" message to the public system 100 (step 310). The mobile station 110 then waits a predetermined period of time for a reply from the public system 100 (312). If the mobile station 110 does not receive a reply within the predetermined period of time, or it receives an "attach failure" message, the mobile station 110 preferably selects and tunes to the autonomous control channel from the neighbor list with the strongest signal (step 314). In other words, the mobile station's attempt to enter PAS mode has failed and the program ends. Of course, if the mobile station's attempt to enter PAS mode fails, it may retry at a later time.

However, if the mobile station 110 receives an "attach success" message from the public system 100 within the predetermined period of time, it transmits a "registration" message to the autonomous system 102 (step 316). When transmitting the "registration" message to the autonomous system 102, the mobile station 110 does not tune its transmitter to a control channel frequency associated with an autonomous system 102. Instead, the mobile station 110 transmits a tunneled "registration" message to the public system 100, which in turn transmits the "registration" message to the autonomous system 102 via the network 108. Once the mobile station 110 successfully attaches to the public system 100 and enters PAS mode, it will exit PAS mode if it receives a "detach" message or a "routing area update failure" message from the public system 100 (steps 318 and 320). When exiting PAS mode, the mobile station 110 preferably selects and tunes to the autonomous control channel from the neighbor list with the strongest signal (step 314).

While in PAS mode, the mobile station 110 is tuned to the public system 100, and, therefore, the mobile station 110 can receive packet data from the public system in a well known manner. However, if the mobile station 110 receives a voice call on the autonomous system while it is in PAS mode, it must be instructed to switch to the autonomous system 102. Accordingly, the autonomous system 102 sends a tunneled "circuit page" message to the public system 100 via the network 108. The public system then relays the "circuit page" message to the mobile station 110. When the mobile station 110 receives the "circuit page" message (FIG. 4, step 400), it preferably selects and tunes to the autonomous control channel from the neighbor list with the strongest signal (step 402) and transmits a "page response" message on the selected channel (step 404). When the call ends, the mobile station 110 may attempt to reenter PAS mode.

If the mobile station wishes to originate an outgoing call (step 406), it preferably selects and tunes to the autonomous control channel from the neighbor list with the strongest signal (step 408) and transmits an "origination" message on the selected channel (step 410). Subsequent control signaling associated with this call also takes on the selected autonomous control channel in a known manner. When the call ends, the mobile station 110 may attempt to reenter PAS mode.

Periodically, the mobile station 110 determines if it is time to check the signal strength of the public and/or autonomous systems control channel signals (step 411). When it is time, the mobile station 110 preferably monitors the signal strength of the public and autonomous systems 102 (step 412). Preferably, all of the control channels from the neighbor list associated with the autonomous system 102 are also checked. By checking the signal strength of the autonomous system substantially concurrent with checking the signal strength of the public system, current drain of the mobile station 110 is reduced without waiting too long to detect a degraded signal from either system. If the signal strength of the autonomous system 102 falls below a predefined threshold (step 414), the mobile station 110 preferably exits PAS mode, thereby receiving both packet and circuit services from the public system. In the preferred embodiment, the mobile station 110 switches to the public system 100 by transmitting a "de-registration" message to the autonomous system 102 via the public system 100 using a tunneled message (step 416) and a "registration" message to the public system 100 (step 418). For example, if the mobile station 110 moves out of the area covered by the autonomous system 102, it preferably detects that the signal strength of the autonomous system 102 is below a level that is acceptable for a voice call and switches operation of voice calls to the public system 100.

In summary, persons of ordinary skill in the art will readily appreciate that a method and apparatus for spanning operation of a cellular telephone between a public cellular system for packet services and an autonomous cellular system for circuit services has been provided. Users of cellular systems implementing the teachings of the present invention can benefit from the reduced airtime charges of autonomous circuit services when they are available, without giving up packet services.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method for spanning operation of a cellular telephone simultaneously between a public cellular system for packet services and an autonomous cellular system for circuit services in communication with the public cellular system, wherein the public cellular system covers a first geographic region and the autonomous cellular system covers a second geographic region, the first geographic region intersecting the second geographic region, the method comprising the steps of:

receiving a pointer to a public control channel associated with the public cellular system via an autonomous broadcast control channel associated with the autonomous cellular system in communication with the public cellular system;

transmitting an attach message to the public cellular system via the public control channel, the attach message being indicative of a request for packet services;

receiving a success message from the public cellular system via the public control channel, the success message being indicative of a positive acknowledgment to the attach message;

transmitting a first registration message to the autonomous cellular system via the public control channel using a first tunneling protocol, the first registration message being indicative of a request to initiate circuit services;

receiving a circuit page message from the autonomous cellular system via the public control channel using a second tunneling protocol, the circuit page message being indicative of a request to accept a pending cellular telephone voice call; and transmitting a page response message to the autonomous cellular system via the autonomous broadcast control channel, the page response message being indicative of a positive acknowledgment to the circuit page message.

2. A method as defined in claim 1, further comprising the step of transmitting an origination message to the autonomous cellular system via the autonomous broadcast control channel, the origination message being indicative of a request to place a cellular telephone voice call.

3. A method as defined in claim 1, further comprising the step of periodically determining a first signal strength associated with the autonomous cellular system.

4. A method as defined in claim 3, wherein the step of periodically determining a first signal strength associated with the autonomous cellular system is performed substantially concurrent with a step of determining a second signal strength associated with the public cellular system.

5. A method as defined in claim 1, further comprising the steps of:

transmitting a de-registration message to the autonomous cellular system via the public control channel using the first tunneling protocol, the de-registration message being indicative of a request to terminate circuit services; and transmitting a second registration message to the public cellular system via the public control channel, the second registration message being indicative of a request to initiate circuit services.

6. A method as defined in claim 1, wherein the first geographic region is larger than the second geographic region.

7. A method as defined in claim 1, wherein the first geographic region completely encompasses the second geographic region.

8. A method as defined in claim 1, wherein the public cellular system comprises a GPRS-136 general packet radio service system.

9. A method as defined in claim 1, wherein the public control channel comprises a GPRS-136 packet control channel.

10. A method as defined in claim 1, wherein the first tunneling protocol and the second tunneling protocol comprises a TIA/EIA-136-336 TOM protocol.

11. A wireless communication device capable of spanning operation simultaneously between a public cellular system for packet services and an autonomous cellular system for circuit services in communication with the public cellular system, wherein the public cellular system covers a first geographic region and the autonomous cellular system covers a second geographic region, the first geographic region intersecting the second geographic region, comprising:

a receiver for receiving (i) a pointer message via an autonomous broadcast control channel associated with the autonomous cellular system in communication with the public cellular system, the pointer message including a pointer to a public control channel associated with the public cellular system, (ii) a success message from the public cellular system via the public control channel, the success message being indicative of a positive acknowledgment to the attach message, and (iii) a circuit page message from the autonomous cellular system via the public control channel using a second tunneling protocol, the circuit page message being indicative of a request to accept a pending cellular telephone voice call;

a transmitter for transmitting (i) an attach message to the public cellular system via the public control channel, the attach message being indicative of a request for packet services, (ii) a first registration message to the autonomous cellular system via the public control channel using a first tunneling protocol, the first registration message being indicative of a request to initiate circuit services, and (iii) a page response message to the autonomous cellular system via the autonomous broadcast control channel, the page response message being indicative of a positive acknowledgment to the circuit page message; and a controller operatively coupled to the transmitter and the receiver, the controller being adapted to (i) decode the pointer message, (ii) decode the success message, (iii) decode the circuit page message, (iv) generate the attach message, (v) generate the first registration message, and (vi) generate the page response message.

12. A wireless communication device as defined in claim 11, wherein the controller is further adapted to cause the transmitter to transmit an origination message to the autonomous cellular system via the autonomous broadcast control channel, the origination message being indicative of a request to place a cellular telephone voice call.

13. A wireless communication device as defined in claim 11, wherein the controller is further adapted to cause the transmitter to transmit a de-registration message to the autonomous cellular system via the public control channel using the first tunneling protocol, the de-registration message being indicative of a request to terminate circuit services; and the controller is further adapted to cause the transmitter to transmit a second registration message to the public cellular system via the public control channel, the second registration message being indicative of a request to initiate circuit services.

14. A wireless communication device as defined in claim 11, wherein the wireless communication device is adapted for operation within a GPRS-136 general packet radio service system.

15. A wireless communication device as defined in claim 11, wherein the public control channel comprises a GPRS-136 packet control channel.

16. A wireless communication device as defined in claim 11, wherein the first tunneling protocol and the second tunneling protocol comprises a TIA/EIA-136-336 TOM protocol.

17. A method for spanning operation of a cellular telephone simultaneously between a public cellular system for packet services and an autonomous cellular system for circuit services in communication with the public cellular system, wherein the public cellular system covers a first geographic region and the autonomous cellular system covers a second geographic region, the first geographic region intersecting the second geographic region, the method comprising the steps of:

receiving a pointer to a public control channel associated with the public cellular system via an autonomous broadcast control channel associated with the autonomous cellular system in communication with the public cellular system;

transmitting an attach message to the public cellular system via the public control channel, the attach message being indicative of a request for packet services;

receiving a success message from the public cellular system via the public control channel, the success message being indicative of a positive acknowledgment to the attach message; and transmitting a first registration message to the autonomous cellular system via the public control channel using a first tunneling protocol, the first registration message being indicative of any of a request for circuit services and a communication path comprises the public cellular system.

18. A method as defined in claim 17, further comprising the step of receiving a first registration accept message indicative of circuit services being initiated.

19. A method as defined in claim 17, further comprising:

receiving a circuit page message from the autonomous cellular system via the public control channel using a second tunneling protocol, the circuit page message being indicative of a request to accept a pending cellular telephone voice call; and transmitting a page response message to the autonomous cellular system via the autonomous broadcast control channel, the page response message being indicative of a positive acknowledgment to the circuit page message.

20. A method as defined in claim 17, further comprising the step of transmitting an origination message to the autonomous cellular system via the autonomous broadcast control channel, the origination message being indicative of a request to place a cellular telephone voice call.

* * * * *

UNITED STATES PATENT AND TRADEMARK OFFICE
CERTIFICATE OF CORRECTION

PATENT NO.   : 6,643,512 B1                                                           Page 1 of 1
DATED        : November 4, 2003
INVENTOR(S)  : Ramaswamy, Satyanarayanan It is certified that error appears in the above-identified patent and that said Letters Patent is hereby corrected as shown below:

<u>Column 8,</u>
Lines 20-25, should read

-- cellular telephone voice call;
    transmitting a page response message to the autonomous cellular system via the autonomous broadcast control channel, the page response message being indicative of a positive acknowledgment to the circuit page message; and
    operating the cellular telephone simultaneously on the public cellular system for packet services and on the autonomous cellular system for voice services. --

<u>Column 9,</u>
Line 37, should read

-- message, and (vi) generate the page response message,
    wherein the controller is further adapted to operate the wireless communication device simultaneously on the public cellular system for packet services while operating the wireless communication device on the autonomous cellular system for voice services.--

<u>Column 10,</u>
Lines 30-36, should read

-- ment to the attach message;
    transmitting a first registration message to the autonomous cellular system via the public control channel using a first tunneling protocol, the first registration message being indicative of any of a request for circuit services and a communication path comprises the public cellular system; and
    operating the cellular telephone on the public cellular system for packet services while operating the cellular telephone on the autonomous cellular system for voice services. --

Signed and Sealed this

Eleventh Day of May, 2004

JON W. DUDAS
*Acting Director of the United States Patent and Trademark Office*